(12) United States Patent
Dotz et al.

(10) Patent No.: US 12,244,192 B2
(45) Date of Patent: Mar. 4, 2025

(54) HAIRPIN WINDING OF A STATOR OF AN ELECTRIC MOTOR

(71) Applicant: Valeo Siemens eAutomotive Germany GmbH, Erlangen (DE)

(72) Inventors: Boris Dotz, Munich (DE); Christian Finger-Albert, Bad Kissingen (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 399 days.

(21) Appl. No.: 17/765,346

(22) PCT Filed: Sep. 11, 2020

(86) PCT No.: PCT/EP2020/075438
§ 371 (c)(1),
(2) Date: Mar. 30, 2022

(87) PCT Pub. No.: WO2021/063649
PCT Pub. Date: Apr. 8, 2021

(65) Prior Publication Data
US 2022/0385128 A1 Dec. 1, 2022

(30) Foreign Application Priority Data
Sep. 30, 2019 (DE) ...................... 10 2019 126 338.7

(51) Int. Cl.
*H02K 3/28* (2006.01)
(52) U.S. Cl.
CPC ...................... *H02K 3/28* (2013.01)
(58) Field of Classification Search
CPC .. H02K 3/28; H02K 3/12; H02K 3/14; H02K 3/50
See application file for complete search history.

(56) References Cited

U.S. PATENT DOCUMENTS 9,136,738 B2 9/2015 Ikeda et al.
2014/0285054 A1 9/2014 Han et al.
(Continued)

FOREIGN PATENT DOCUMENTS

CN 209267302 U 8/2019
DE 112013003398 T5 4/2015
(Continued)

OTHER PUBLICATIONS

International Search Report and Written Opinion issued in corresponding International Patent Application No. PCT/EP2020/075438, mailed on Dec. 11, 2020 (13 pages).
(Continued)

*Primary Examiner* — Tulsidas C Patel
*Assistant Examiner* — Mohammed Ahmed Qureshi
(74) *Attorney, Agent, or Firm* — Osha Bergman Watanabe & Burton LLP

(57) ABSTRACT

A stator for an electric machine is disclosed. The stator has a plurality of pins arranged in slots in the stator on concentric circles at different distances from a center point, each concentric circle forming a layer. Each of six pins in different layers are connected to one another in series and form a winding. A first pin of the winding in a first slot in the 6n-4 layer, n being a natural number, a second pin of the winding in a second slot in the 6n-5 layer, a third pin of the winding in the first slot in the 6n-2 layer, a fourth pin of the winding in the second slot in the 6n-3 layer, a fifth pin in the first slot in the 6n layer, and a sixth pin of the winding in the second slot in the 6n-1 layer.

20 Claims, 19 Drawing Sheets

(56) References Cited

U.S. PATENT DOCUMENTS

| | | | |
|---|---|---|---|
| 2015/0207374 A1 | 7/2015 | Tsuiki et al. | |
| 2015/0381001 A1* | 12/2015 | Tsuiki | H02K 3/28 |
| | | | 310/208 |

FOREIGN PATENT DOCUMENTS

| | | |
|---|---|---|
| DE | 112013006691 T5 | 10/2015 |
| DE | 102017210445 A1 | 12/2018 |
| JP | 2004-064914 A | 2/2004 |
| JP | 2012-029368 A | 2/2012 |
| JP | 2016-214011 A | 12/2016 |
| WO | 2014/125646 A1 | 8/2014 |

OTHER PUBLICATIONS

Office Action issued in corresponding JP Application No. 2022-520156, Dated Apr. 21, 2023 (23 pages with English Translation).

* cited by examiner

HAIRPIN WINDING OF A STATOR OF AN ELECTRIC MOTOR

The invention relates to a stator with pins for an electric machine, in particular an electric motor.

PRIOR ART

Electric machines are generally known and are being increasingly used as electric motors for the driving of vehicles. An electric machine consists of a stator and a rotor.

The stator comprises a plurality of slots, in which the windings are guided. The windings may be formed from isolated copper rods in the form of what are referred to as pins. The rotor is located in the stator and is connected to a rotor shaft.

Such a pin motor, U-pin motor or hairpin motor is known from U.S. Pat. No. 9,136,738 B2, for example.

Problem and Solution

The subject of the present invention is to provide a stator having windings composed of pins, and which is easy to manufacture.

According to the invention, a stator for an electric machine comprises a plurality of pins, which are arranged in slots in the stator on concentric circles at different distances from a stator center point and each concentric circle forms a layer, wherein six pins in different layers are respectively connected to one another in series and form a winding, a first pin of the winding is located in a first slot in the 6n-4 layer, wherein n is a natural number greater than zero; a second pin of the winding is located in a second slot in the 6n-5 layer, wherein the second slot is at a first radial distance from the first slot in a first circumferential direction of the stator, a third pin of the winding is located in the first slot in the 6n-2 layer, a fourth pin of the winding is located in the second slot in the 6n-3 layer, a fifth pin is located in the first slot in the 6n layer, a sixth pin of the winding is located in the second slot in the 6n-1 layer.

In this respect, a winding can also encircle the teeth multiple times. The layers can be numbered in increasing order from the outside to the inside in relation to the stator center point.

A stator having the winding according to the invention can be produced easily and generates an efficient electromagnetic field. The types of connection produce an electrically conductive connection between the pins in the slots. The type of connection may be the welding of conductors onto the pins or the pins may already be in the form of a double pin, what is referred to as a U-pin, and thereby already produce a connection when inserted into the stator. Furthermore, the welding together of end portions of pins that are bent toward one another also constitutes a type of connection.

It is preferably possible for the stator to have a first and a second front end and for the first and the second pin to be connected to one another on the second front end by means of a first type of connection, for the second and the third pin to be connected to one another on the first front end by means of a second type of connection, for the third and the fourth pin to be connected to one another on the second front end by means of a third type of connection, for the fourth and the fifth pin to be connected to one another on the first front end by means of a fourth type of connection, for the fifth and the sixth pin to be connected to one another on the second front end by means of a fifth type of connection, wherein the first, second, third, fourth and fifth types of connection differ from one another.

The different types of connection make improved manufacture possible. Alternating the position of the types of connection on different front ends makes it possible to efficiently form a winding around the stator teeth lying between the slots.

Even types of connection on the same front end of the stator may differ by virtue of a pin foot being bent in different directions in relation to the stator interior or exterior.

In one embodiment of the invention, the stator may have at least two windings and at least the sixth pin in the second slot may be connected to a seventh pin in the 6n-4 layer in a third slot by means of a sixth type of connection.

A combination of the above-mentioned types of connection on different or the same front ends of the stator is also possible. The same type of connection on the same front ends and different types of connection on different front ends of the stator makes easy and quick manufacture possible. For example, on one front end the connection is produced by virtue of a type of pre-bent pins, what are referred to as double pins or else U-pins, and on another front end of the stator single pins or respective sides of the double pin are welded to one another. The weld points may lie at feet of the pins or double pins.

It is furthermore preferably possible for the stator to comprise a plurality of windings, which extend over the entire circumference of the stator and thereby form a coil section.

This means that the windings have a symmetry, which creates a uniform revolving field.

In a further embodiment, respective pins of three coil sections may be connected to one another by means of a seventh type of connection or an eighth type of connection and form a coil.

These pins may be what are referred to as endpins, since they mark the end of a coil section.

It is preferably possible for the coil sections to form six coils and for three phases to be assigned to them in such a way that two coils, which are assigned to the same phase, are respectively located in three adjacent slots.

It is furthermore possible for respective inputs of an endpin of two coils to be connected to one another by means of a ninth type of connection.

The ninth type of connection may be produced by a conductor attached to the pins or by a conductive ring.

The two coils may be connected in parallel and may additionally be fed by the same phase. The parallel connection may be effected by connecting a first and a fifth or a fourth and an eighth end pin in pairs.

The two coils may be connected in parallel and may additionally be fed by the same phase.

In a preferred embodiment of the invention, it is possible for respective outputs of an end pin of the two coils to be connected to one another and for the two coils as a result to be connected in parallel, and in particular assigned to one phase.

It is furthermore possible for two phases to respectively have an approximately identical current and voltage profile, and as a result for a six-phase inverter to control only a three-phase motor. This arrangement makes a current division of the switching elements in the inverter possible.

Two coils in the same slots may thus be connected in parallel and fed by one phase, resulting in a stator having windings for a three-phase electric machine.

It is preferably possible for the second type of connection to comprise a first double pin, which is formed from the second pin and the third pin, wherein the first double pin has two inwardly bent pin feet with a respective weld point and bridges a first radial distance.

The double pin may be inserted into the stator from one front end and be welded to a further double pin on the other front end.

In one embodiment of the invention, the fourth type of connection may comprise a second double pin, which is formed from the fourth pin and the fifth pin, wherein the second double pin has two inwardly bent pin feet with a respective weld point and bridges a first radial distance.

The first distance describes a number of slots to be bridged. The actual spatial distance to be bridged depends on the position of the pins in the layer, because the double pins connect different layers.

It is preferably possible for the sixth type of connection to comprise a third double pin, which is formed from the sixth pin and the seventh pin, wherein the second double pin has two outwardly bent pin feet with a respective weld point and bridges a first radial distance.

It is furthermore preferably possible for the seventh type of connection to comprise a fourth double pin, which is formed from a second end pin and a third end pin, wherein the fourth double pin has two outwardly bent pin feet with a respective weld point and bridges a second radial distance.

The second radial distance may be at least one slot shorter than the first radial distance.

In a further embodiment of the invention, the eighth type of connection may comprise a fifth double pin, which is formed from a sixth end pin and a seventh end pin, wherein the fifth double pin has two inwardly bent pin feet with a respective weld point and bridges a second radial distance.

In a further embodiment, a first single pin may comprise a first end pin, and have a pin foot which is bent clockwise and has a weld point.

It is preferably possible for a second single pin to comprise a fifth end pin, and have a pin foot which is bent counterclockwise and has a weld point.

It is furthermore preferable for a third single pin to comprise a fourth end pin, and have a pin foot which is bent counterclockwise and has a weld point.

In a further embodiment, a fourth single pin may comprise an eighth end pin, and have a pin foot which is bent clockwise and has a weld point.

It is preferably possible for the first type of connection to be formed by a welded connection between a first weld point at the pin foot of the first double pin or of the fifth double pin or of the second single pin and a second weld point at the pin foot of the third double pin or of the fourth double pin or of the first single pin.

In a further embodiment, the third type of connection may be formed by a welded connection between a third weld point at the pin foot of the first double pin or of the fifth double pin and a fourth weld point at the pin foot of the second double pin or of the third single pin.

It is preferably possible for the fifth type of connection to be formed by a welded connection between a fifth weld point at the pin foot of the second double pin or of the fourth single pin and a sixth weld point at the pin foot of the third double pin or of the fourth double pin or of the fourth single pin.

According to the invention, a vehicle comprises an electric machine with a stator according to one of the preferred embodiments.

DESCRIPTION OF THE FIGURES

FIG. 1 shows a stator 1 having a plurality of slots 5 in which pins 2, 3 are guided. The stator 1 has a first front end 7 and an oppositely situated second front end 9. On the first front end 7, inputs 81, 87, 101, 107, 111, 117 of coil sections for connecting the pins to an energy source for the operation of the electric machine are shown. Of course, a rotor is also necessary for the operation of an electric machine. For connection purposes, the pins lie close to one another and make short connection lines possible.

FIG. 2 shows a stator 1 having slots and pins on six layers, only six slots 51, 52, 53, 54, 55, 56 being illustrated. Pins 21, 22, 23, 24, 25, 26, 27 are arranged in the slots. The pins lie next to one another in a slot; in the example of FIG. 2, six pins lie next to one another in a slot. The six pins within one slot therefore lie on different concentric circles L1, L2, L3, L4, L5, L6 around the center point M of the stator, which circles thus form individual layers. There is a distance 71 between two respective slots. This distance 71 is identical between all of the slots shown in FIG. 2.

FIG. 3 shows the stator 1 from FIG. 2. The pins are still arranged on concentric circles, that is to say layers, the concentric circles not being depicted for the sake of better illustration. FIG. 3 illustrates which pins are connected to one another in series. A first pin 21 is located in a first slot 51 in the layer L2. This first pin 21 is connected to a second pin 22 in a second slot 52 by means of a first type of connection 61, illustrated as a solid line. The second pin 22 is located in the layer L1. The second pin 22 is connected to a third pin 23 in the first slot 51 by means of a second type of connection 62, illustrated as a dashed line. The third pin 23 is located in turn in the first slot 51, that is to say in the same slot as the first pin 21. The third pin 23, however, lies in the layer L4. Consequently, there is still space for a further pin in layer L3 between the first pin 21 and the third pin 23 in the first slot 51.

Figure 1:
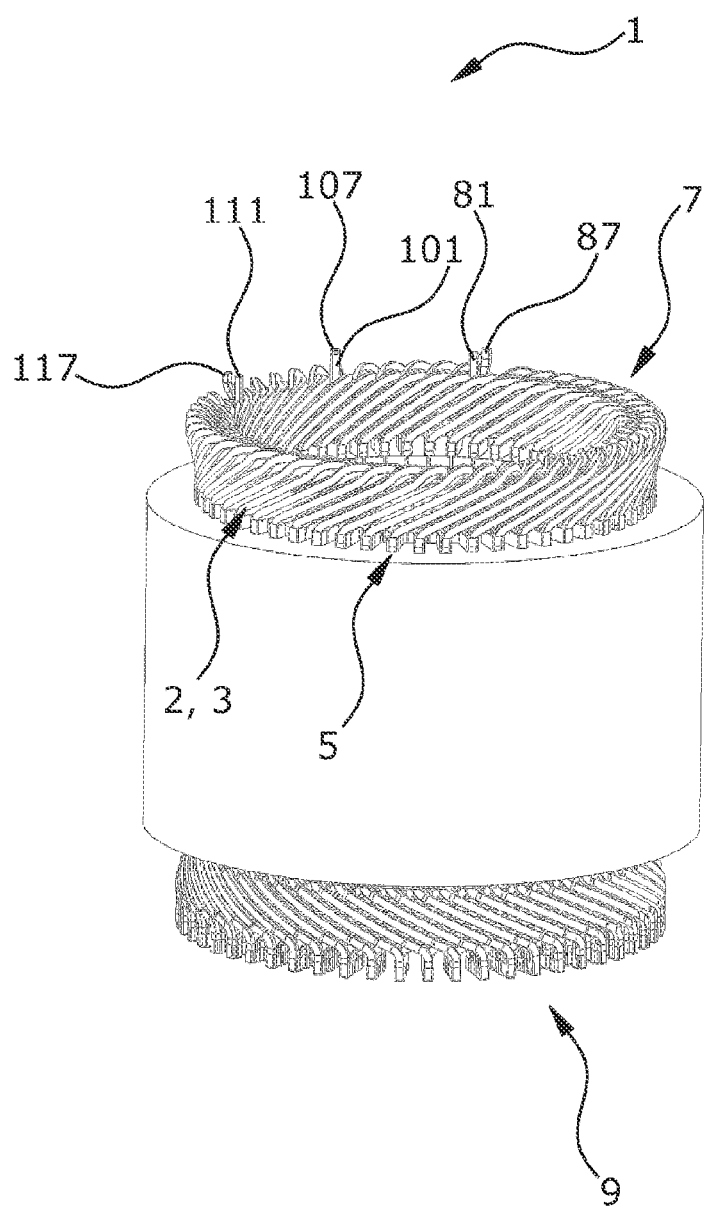
FIG. 1 shows a stator.

The third pin 23 is connected to a fourth pin 24 via a third type of connection 63, illustrated as a long-spacing dotted line. The fourth pin 24 lies in the same second slot 52 as the second pin 22. The fourth pin 24 lies in the layer L3.

Consequently, there is still space in the second slot 52 for a further pin in layer L2 between the fourth pin 24 and the second pin 22.

The fourth pin 24 is connected to a fifth pin 25 in the first slot 51 by means of a fourth type of connection 64, illustrated as a long-spacing dashed line. The fifth pin 25 is located in turn in the first slot 51, that is to say in the same slot as the first pin 21 and the third pin 23. The fifth pin 25 lies in the layer L6. Consequently, there is still space for a further pin in layer L5 between the third pin 23 and the fifth pin 25 in the first slot 51.

The fifth pin 25 is connected to a sixth pin 26 via a fifth type of connection 65, illustrated as an ultrashort-spacing dotted line. The sixth pin 26 lies in the same slot 52 as the second pin 22 and the fourth pin 24. The sixth pin 26 lies in the layer L5. Consequently, there is still space in the second slot 52 for a further pin in layer 4 between the fourth pin 24 and the sixth pin 26. The connection of the first, second, third, fourth, fifth and sixth pins forms a first winding 41.

The sixth pin 26 is connected to a seventh pin 27 in the layer L2 in a third slot 53 via a sixth type of connection 66, illustrated as a short-spacing dotted line. With the seventh pin 27, the above-described serial connection of the subsequent pins in the stator begins again, with the seventh pin 27 being similar to the first pin 21 but with the slot being offset by 120 degrees.

The serial connection of the seventh pin 27 to further pins in two further slots 53 and 54 forms a second winding 42. The first, second, third, fourth and fifth types of connection 61, 62, 63, 64, 65 between these pins are identical to the respective first, second, third, fourth and fifth types of connection 61, 62, 63, 64, 65 of the pins of the first winding 41.

The two windings 41, 42 are connected by the sixth type of connection 66. The continuation of the serial connection forms the third winding 43 in two further slots 55, 56. The windings 41, 42, 43 are respectively connected by means of the sixth type of connection 66. The sixth type of connection 66 between the respective windings is therefore identical. It is also the case that the first, second, third, fourth and fifth types of connection 61, 62, 63, 64, 65 between the pins of the winding 43 are identical to the first, second, third, fourth and fifth types of connection 61, 62, 63, 64, 65 of the first and the second winding 41, 42.

The three windings 41, 42, 43 form a first coil section by way of a clockwise circuit around the stator 1. The first pin 21 furthermore has an input 81 for the connection of an energy source. The first pin 21 of the winding 41 therefore constitutes a first end pin. The coil section ends with the pin 28 of the winding 43. The last pin 28 of the winding 43 therefore constitutes a second end pin.

Figure 3:
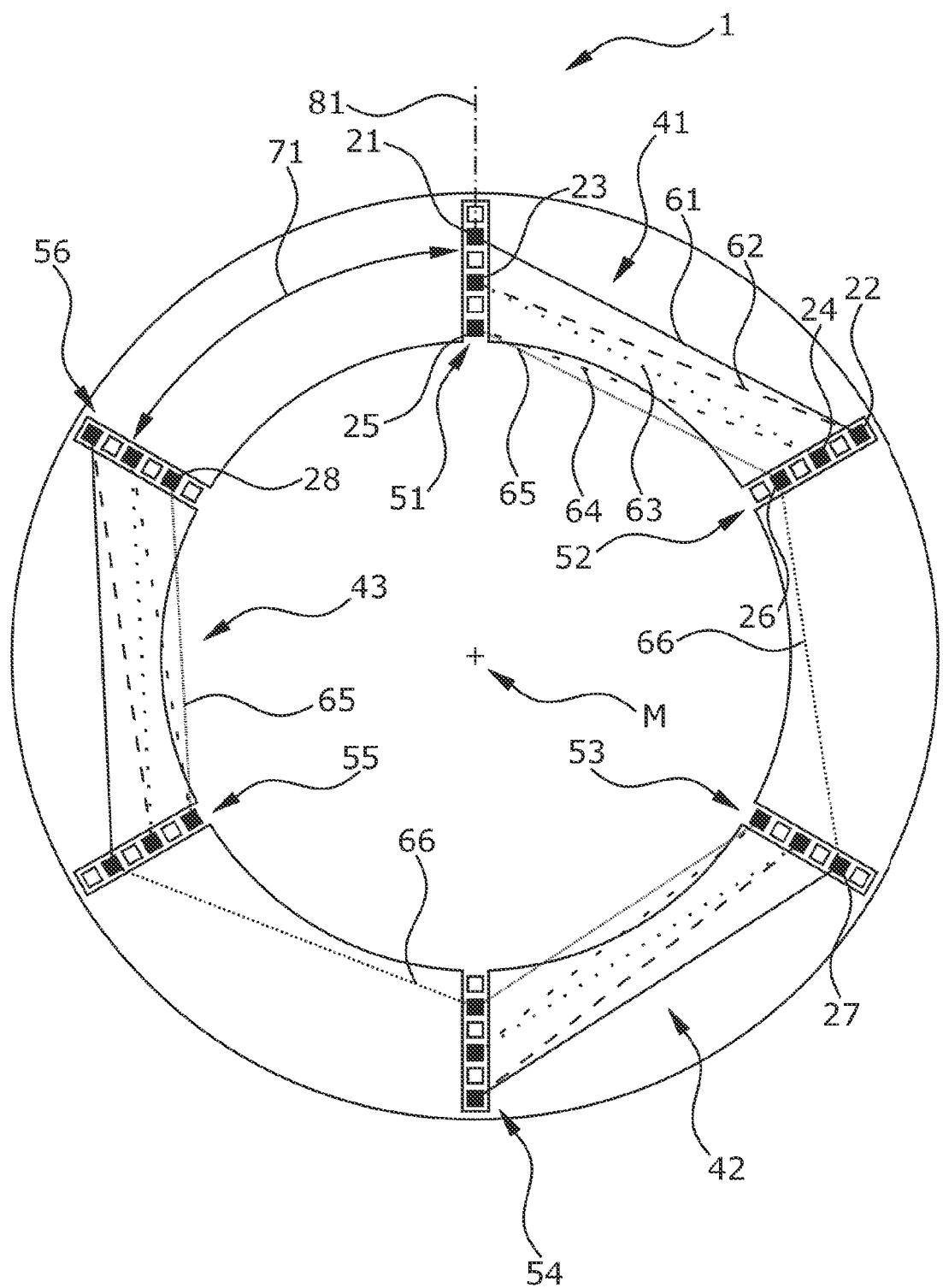
FIG. 3 shows a winding pattern of a first coil section.
Figure 4:
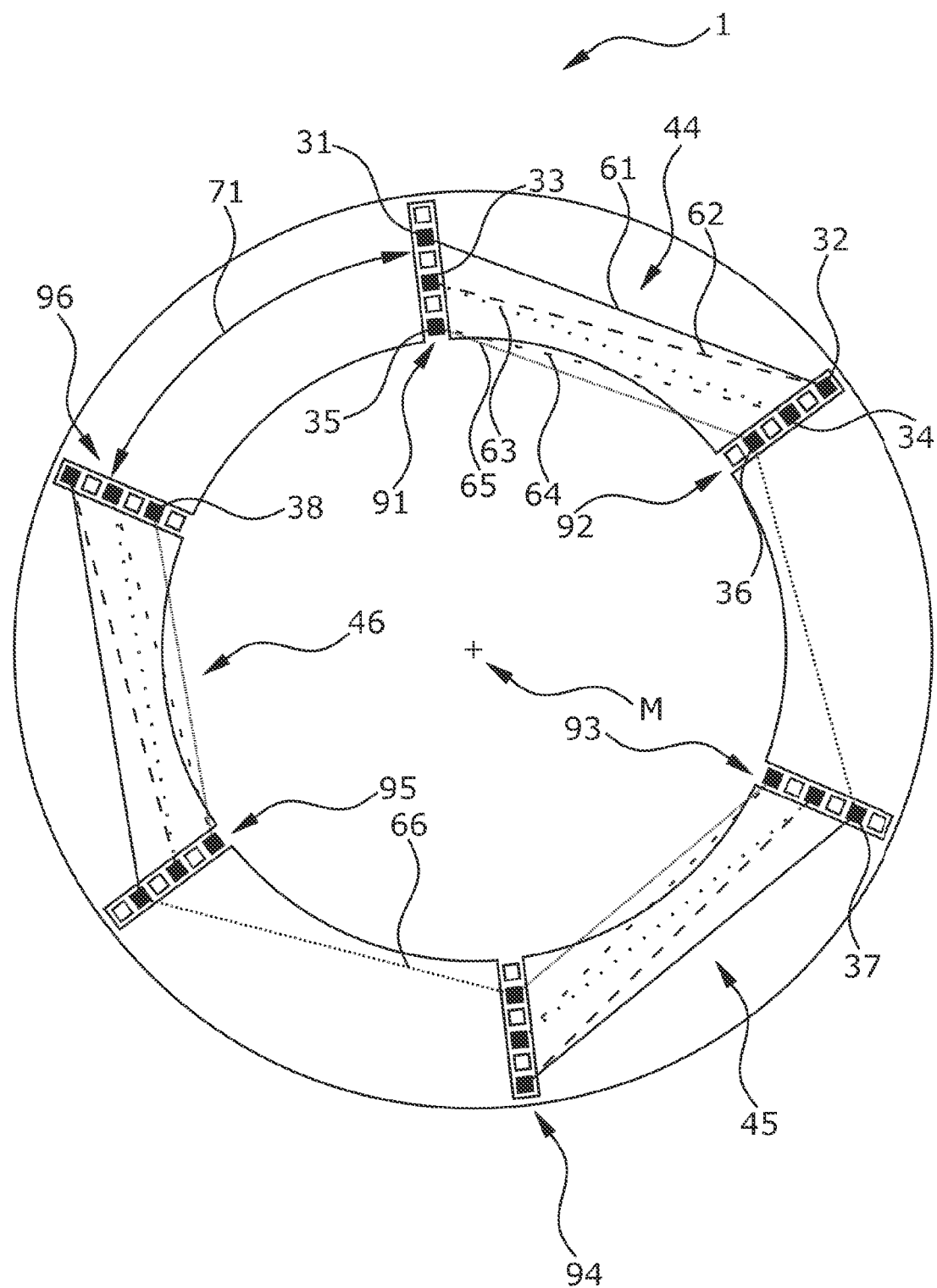
FIG. 4 shows a winding pattern of a second coil section.

FIG. 4 shows the stator 1 from FIG. 3 and shows six slots 91, 92, 93, 94, 95, 96, which are located in the direct vicinity of the slots of FIG. 3.

The pins 31, 32, 33, 34, 35, 36, 37, 38 are connected in the same way as the pins 21, 22, 23, 24, 25, 26, 27, 28 of FIG. 3. Even the type of connection is identical to FIG. 3 and is made clear by the same reference signs. In the same way as described for FIG. 3, the windings 44, 45, 46 are formed and connected to one another clockwise by the sixth type of connection 66.

The three windings 44, 45, 46 form a second coil section by way of a clockwise circuit around the stator 1. The coil section begins with 31, which is a third end pin. The coil section ends with the pin 38 of the winding 46. The last pin 38 of the winding 43 therefore constitutes a further second end pin.

Figure 5:
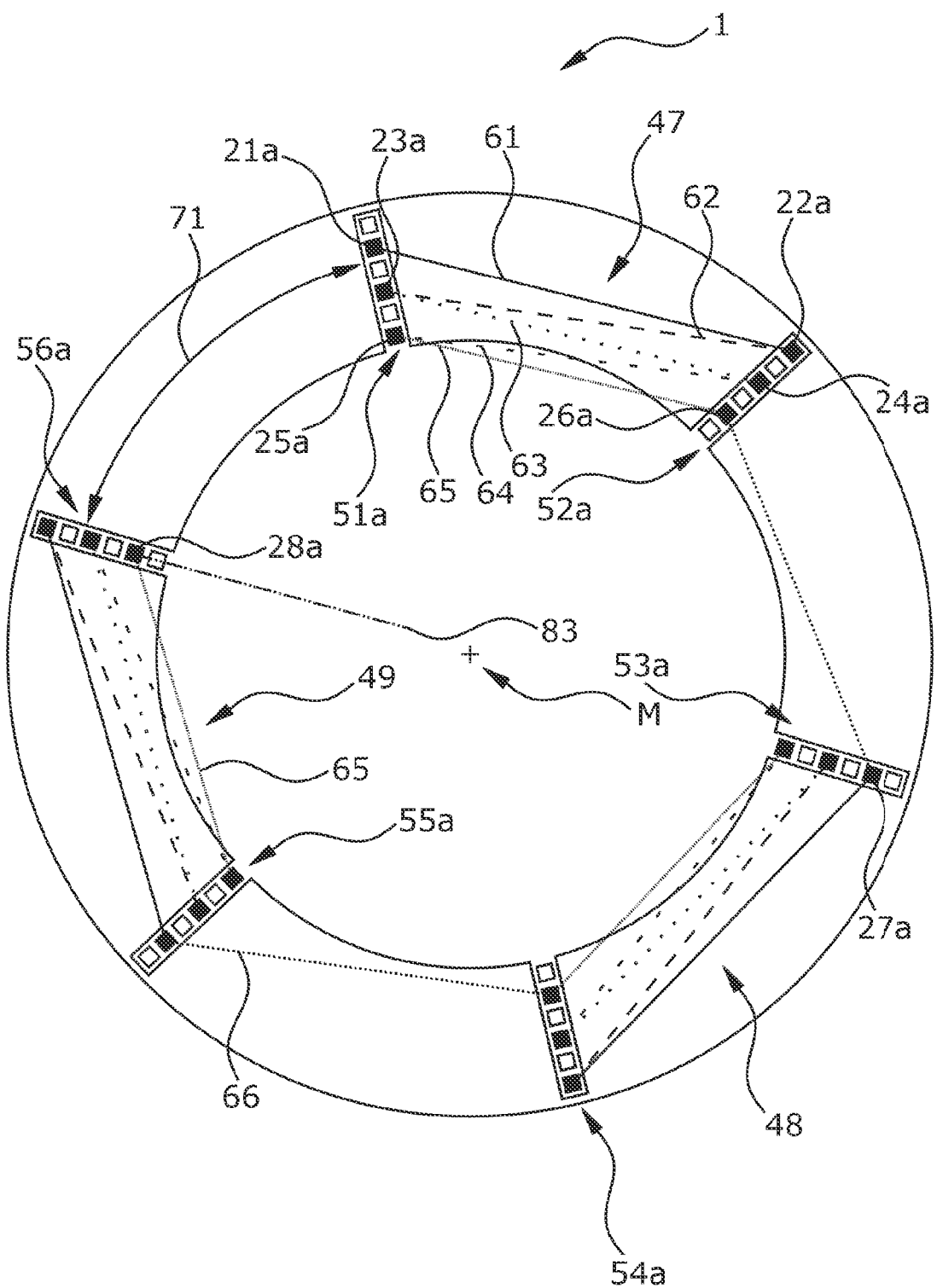
FIG. 5 shows a winding pattern of a third coil section.

FIG. 5 shows the stator 1 from FIG. 3 and FIG. 4 and shows six slots 51a, 52a, 53a, 54a, 55a, 56a, which are located in the direct vicinity of the slots of FIG. 4.

The pins 21a, 22a, 23a, 24a, 25a, 26a, 27a, 28a are connected in the same way as the pins 21, 22, 23, 24, 25, 26, 27, 28 of FIG. 3 and the pins 31, 32, 33, 34, 35, 36, 37, 38 of FIG. 4. Even the type of connection is identical to FIGS. 3 and 4 and is made clear by the same reference signs. In the same way as described for FIGS. 3 and 4, the windings 47, 48, 49 are formed and connected to one another clockwise by the sixth type of connection 66. The last pin 28a in slot 56a on the layer L5 in the winding 49 is a fourth end pin and has an output 83 for the connection of an energy source. The three windings 47, 48, 49 form a third coil section by way of a clockwise circuit around the stator 1. The pin 21a is the start of the coil section and constitutes a further third end pin. The coil section ends with the pin 28a of the winding 49. The slots illustrated in FIG. 5 are at a first distance 71 from one another.

Figure 6:
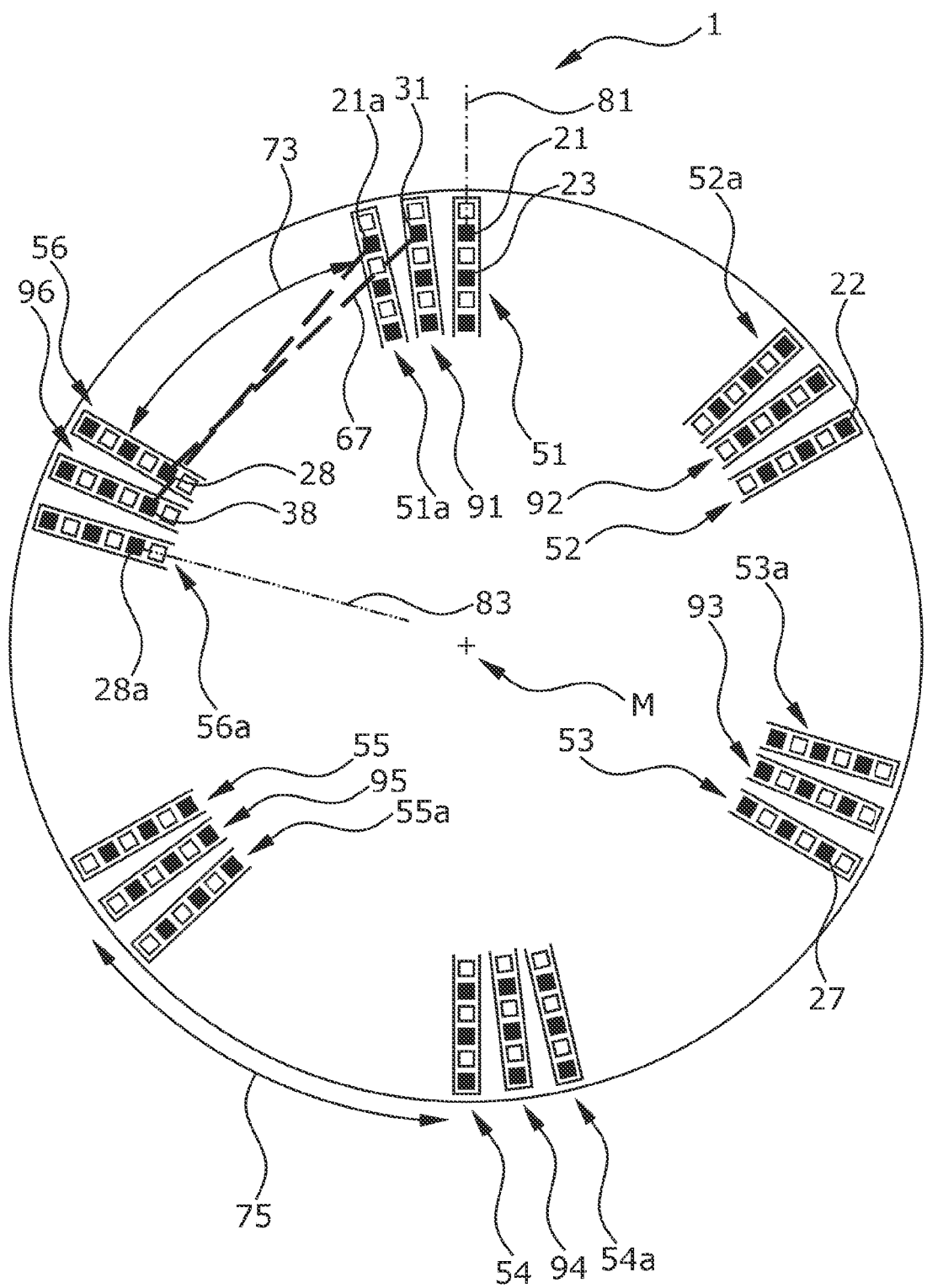
FIG. 6 shows a stator having three coil sections and the connection of said coil sections to one another, and thus a first coil.

FIG. 6 shows a pin configuration through the first, second and third coil sections from FIGS. 3, 4 and 5, which are illustrated by black squares. The same reference signs denote the same pins, slots and connections in the figures. The sixth pin 28 of the winding 43 of the first coil section in slot 56, layer L5, which is also a second end pin, and the first pin 31 of the first winding 44 of the second coil section in slot 91, layer L2, which is also a third end pin, are connected by means of a seventh type of connection 67.

The sixth pin 38 of the winding 46 of the second coil section in slot 96, layer L5, which is also a second end pin, and the first pin 21a of the first winding 47 of the third coil section in slot 51a, layer L2, which is also a third end pin, are connected by means of the seventh type of connection 67.

Consequently, the seventh type of connection 67 connects a second end pin 28, 38 to a third end pin 21a, 31.

The three coil sections thus form a first coil 201 with an input 81 and an output 83 after three radial clockwise circuits around the stator. A second distance 75, illustrated in the figure, is one slot shorter than the first distance 71 from the previous figure. Furthermore, a third distance 73 between the slots of a coil is shown. This is two slots shorter than the first distance 71 and one slot shorter than the second distance.

Figure 2:
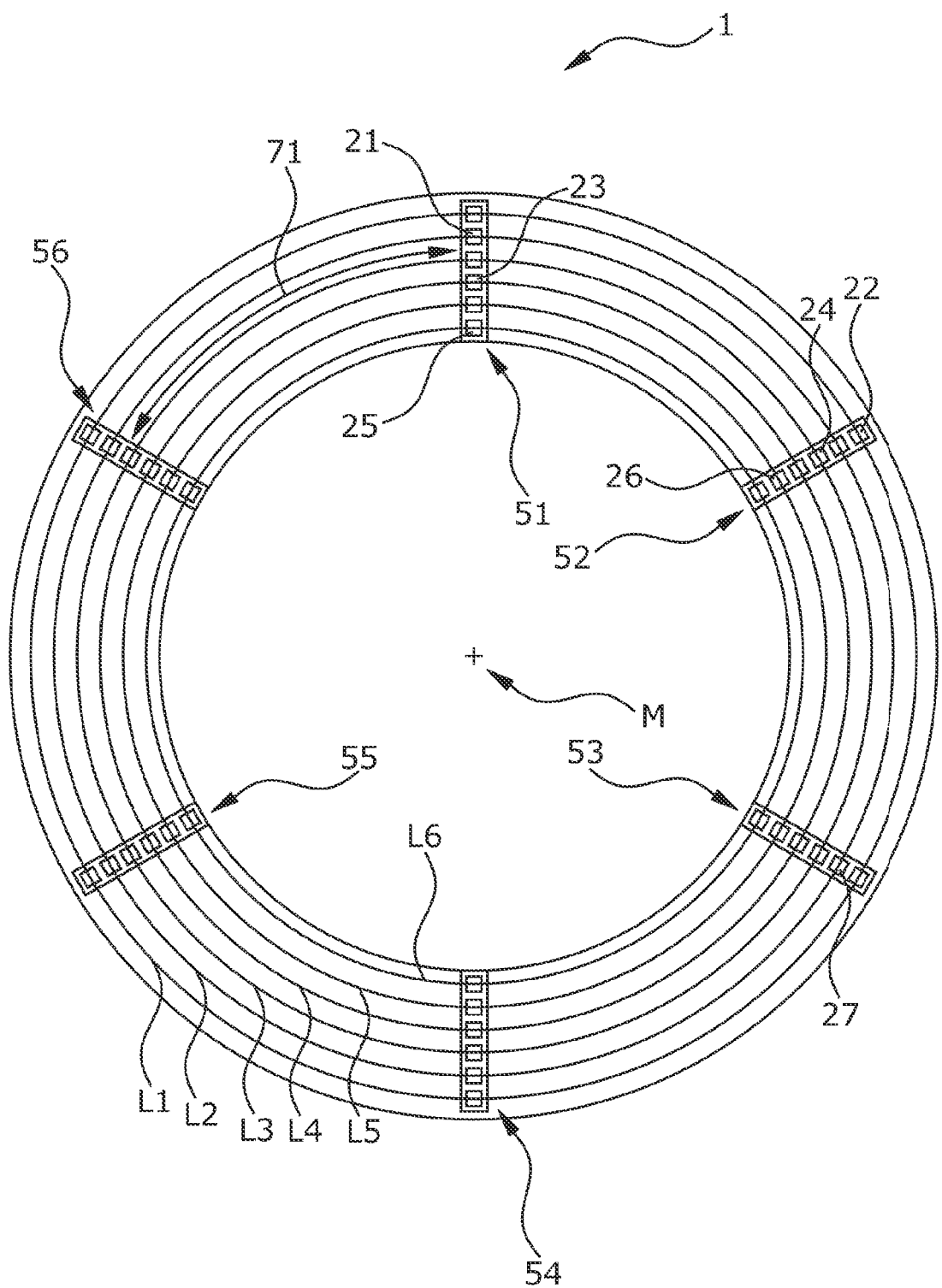
FIG. 2 shows a stator having six slots and six layers.
Figure 7:
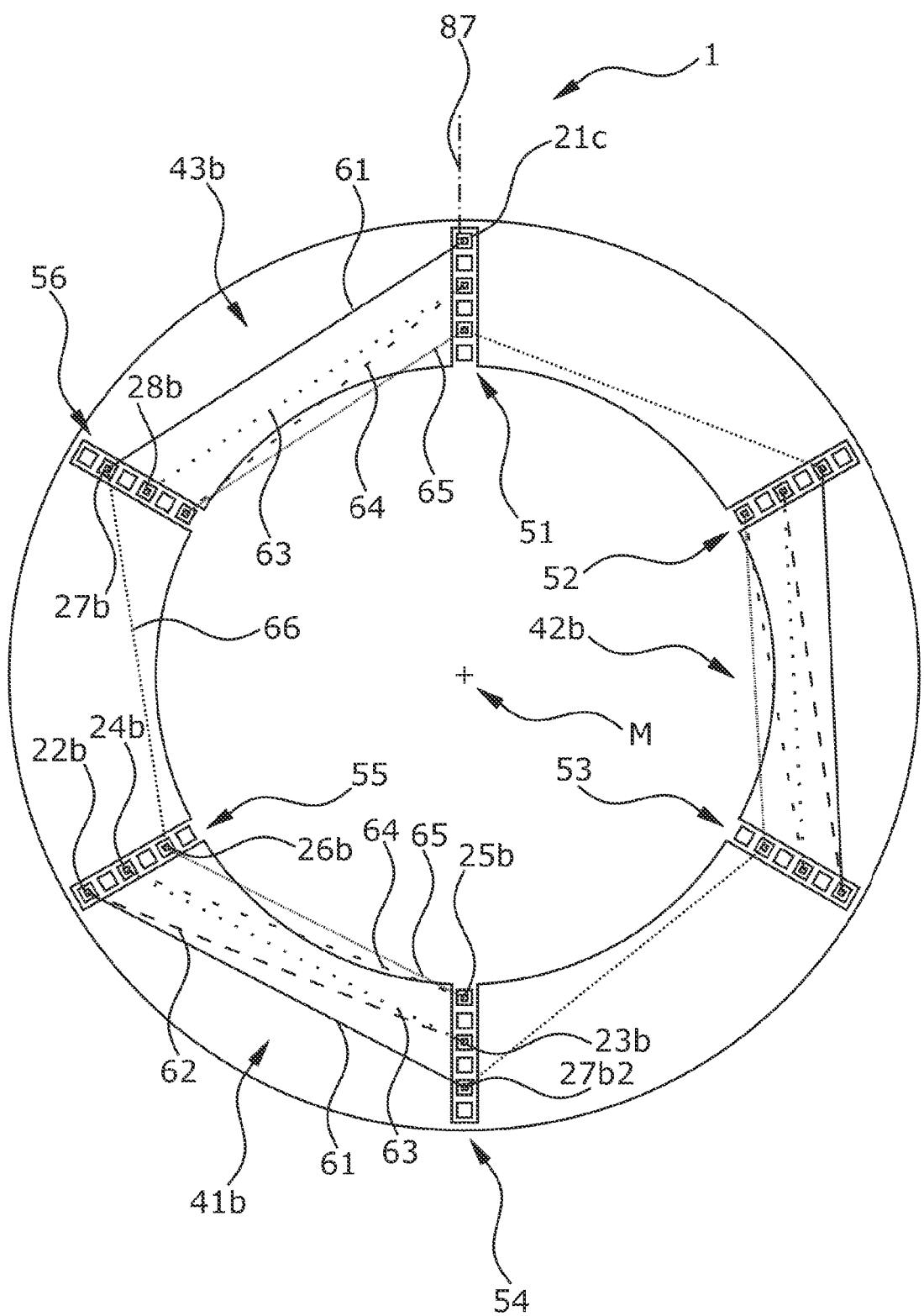
FIG. 7 shows a winding pattern of a further first coil section.

FIG. 7 shows the stator 1 from FIG. 2. The pins are still arranged on concentric circles, that is to say layers, the concentric circles not being depicted for the sake of better illustration. What is illustrated is those pins, illustrated as black squares on a white background, that are connected to one another in series and form a first coil section of a second coil 202. A fifth end pin 21c is located in a first slot 51 in the layer L1. This fifth end pin 21c is connected to a seventh pin 27b in the sixth slot 56 by means of the first type of connection 61. The seventh pin 27b is located in the layer L2. The seventh pin 27b is connected to a sixth pin 26b in the layer L5 in the fifth slot 55 by means of the sixth type of connection 66.

The sixth pin 26b is connected to a fifth pin 25b in the layer L6 of the fourth slot 54 by way of the fifth type of connection 65. The fifth pin 25b is connected to a fourth pin 24b in the fifth slot 55 by means of the fourth type of connection 64. The fourth pin 24b is located in turn in the fifth slot 55, that is to say in the same slot as the sixth pin 26b. The fourth pin 24b lies in the layer L3. Consequently, there is still space for a further pin in layer L4 between the sixth pin 26b and the fourth pin 24b in the slot 55.

The fourth pin 24*b* is connected to a third pin 23*b* by way of the third type of connection 63. The third pin 23*b* lies in the same slot 54 as the fifth pin 25*b*. The third pin 23*b* lies in the layer L4. Consequently, there is still space in the slot 54 for a further pin in layer L5 between the fifth pin 25*b* and the third pin 23*b*.

The third pin 23*b* is connected to a second pin 22*b* by way of the second type of connection 62. The second pin 22*b* lies in the same slot 55 as the fourth pin 24*b* and the sixth pin 26*b*. The second pin 22*b* lies in the layer L1. Consequently, there is still space in the slot 55 for a further pin in layer L2 between the fourth pin 24*b* and the second pin 22*b*.

The second pin 22*b* is connected to a further seventh pin 27*b*2 by way of the first type of connection 61. This seventh pin 27*b*2 lies in the same slot 54 as the third pin 23*b*. The seventh pin 27*b*2 lies in the layer L2.

Consequently, there is still space in the slot 54 for a further pin in layer L3 between the third pin 23*b* and the seventh pin 27*b*. The two seventh pins 27*b*, 27*b*2 lie in identical layers but in slots that are rotated by 120 degrees.

The type of connection of the first, second, third, fourth, fifth and sixth pins forms a first winding 41*b* of the first coil section of the second coil 202.

The serial connection of the seventh pin 27*b*2 in the fourth slot 54 to further pins in the third and the second slot 53 and 52 forms a second winding 42*b*. The first, second, third, fourth and fifth types of connection 61, 62, 63, 64, 65 between these pins are identical to the respective first, second, third, fourth and fifth types of connection 61, 62, 63, 64, 65 of the pins in the previous figures.

The two windings 41*b*, 42*b* are connected by the sixth type of connection 66. At the start, the third winding 43*b* is begun by the fifth end pin 21*c* and, after the counterclockwise circuit around the stator, is completed by the continuation of the serial connection in the first and the sixth slot 51, 56.

The windings 41*b*, 42*b*, 43*b* are respectively connected by means of the sixth type of connection 66. The sixth type of connection 66 between the respective windings is therefore identical. It is also the case that the first, third, fourth and fifth types of connection 61, 63, 64, 65 between the pins of the winding 43*b* are identical to the first, third, fourth and fifth types of connection 61, 63, 64, 65 of the first and the second winding 41*b*, 42*b*. There is no second type of connection 62 in the winding 43*b*.

The three windings 41*b*, 42*b*, 43*b* form a first coil section of the second coil 202 by way of a counterclockwise circuit around the stator 1. The fifth end pin 21*c* furthermore has an input 87 for the connection of an energy source. The first coil section of the second coil ends with a sixth end pin 28*b* of the winding 43*b*.

Figure 8:
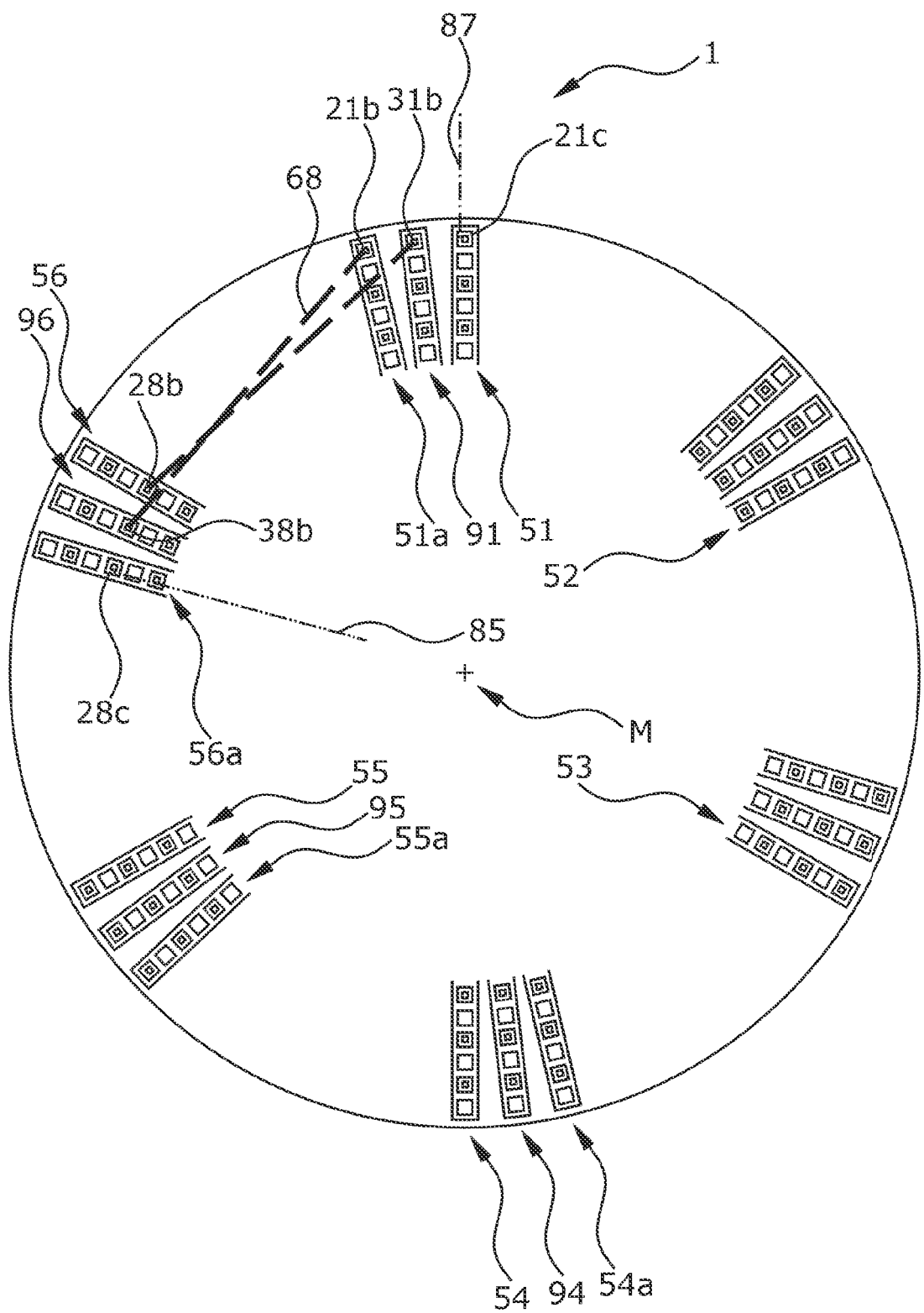
FIG. 8 shows a stator having three further coil sections and the connection of said coil sections to one another, and thus a second coil.
Figure 21:
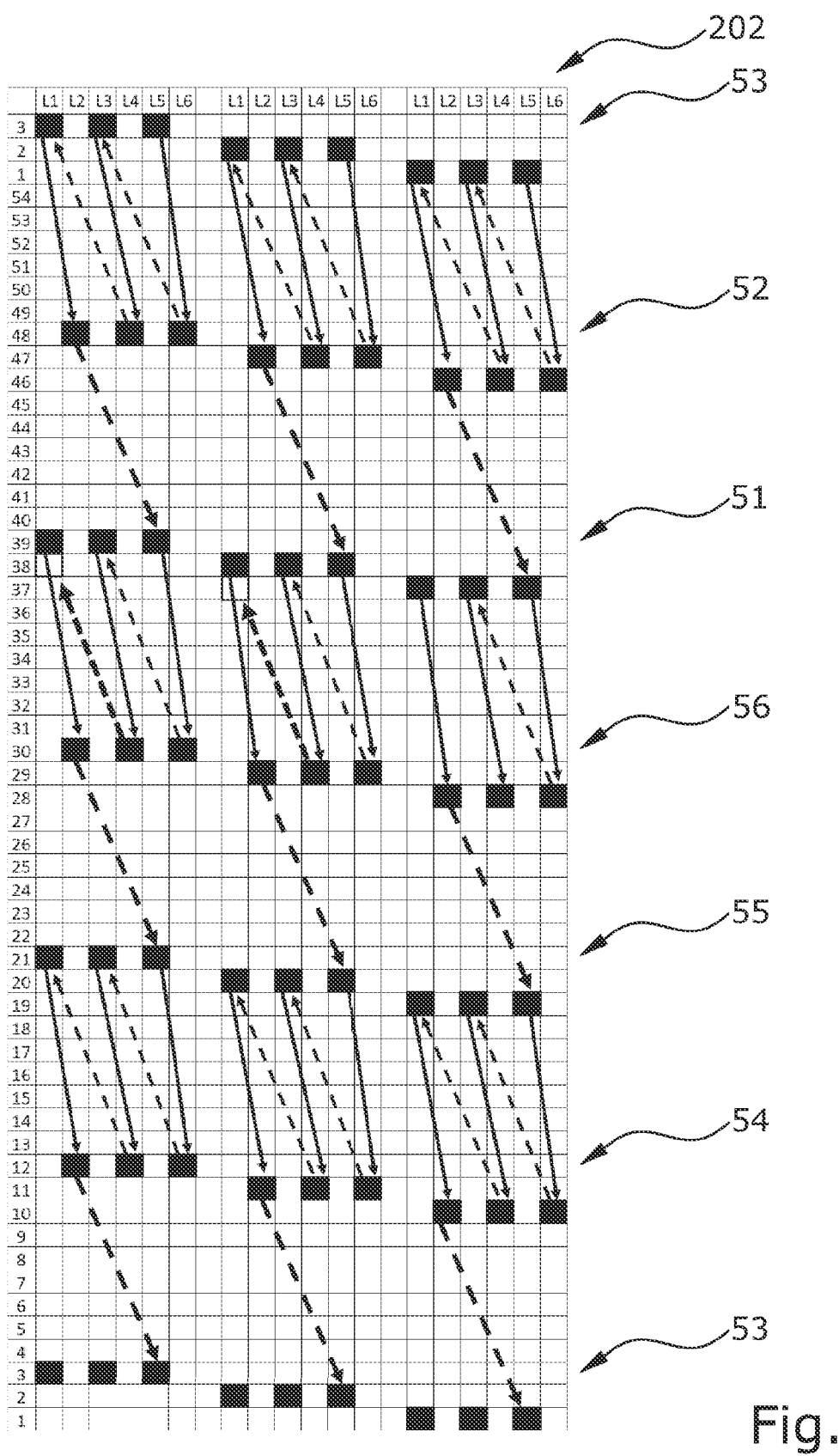
FIG. 21 shows a winding pattern of a second coil.

FIG. 8 shows a pin configuration through the first coil section of the second coil from FIG. 7 and pins of two further coil sections which are connected according to the pattern of FIGS. 7 and 21, the slots lying counterclockwise directly adjacent to the slots from FIG. 7.

The first, second and third coil sections of the second coil are illustrated by black double squares. The same reference signs denote the same pins, slots and connections in the figures. The sixth end pin 28*b* of the winding 43*b* of the first coil section of the second coil in slot 56, layer L4 and a seventh end pin 31*b* of a first winding of the second coil section of the second coil in slot 91 in layer L1 are connected by means of an eighth type of connection 68. A sixth end pin 38*b* of the first winding of the second coil section of the second coil in slot 96, layer L4 and a seventh end pin 21*b* of the first winding of the third coil section of the second coil in slot 51*a*, layer L1 are connected by means of the eighth type of connection 68.

The three coil sections thus form the second coil 202 with an input 87 and an output 85 after three radial counterclockwise circuits around the stator. An eighth end pin 28*c* furthermore has the output 85 for the connection of an energy source.

Figure 9:
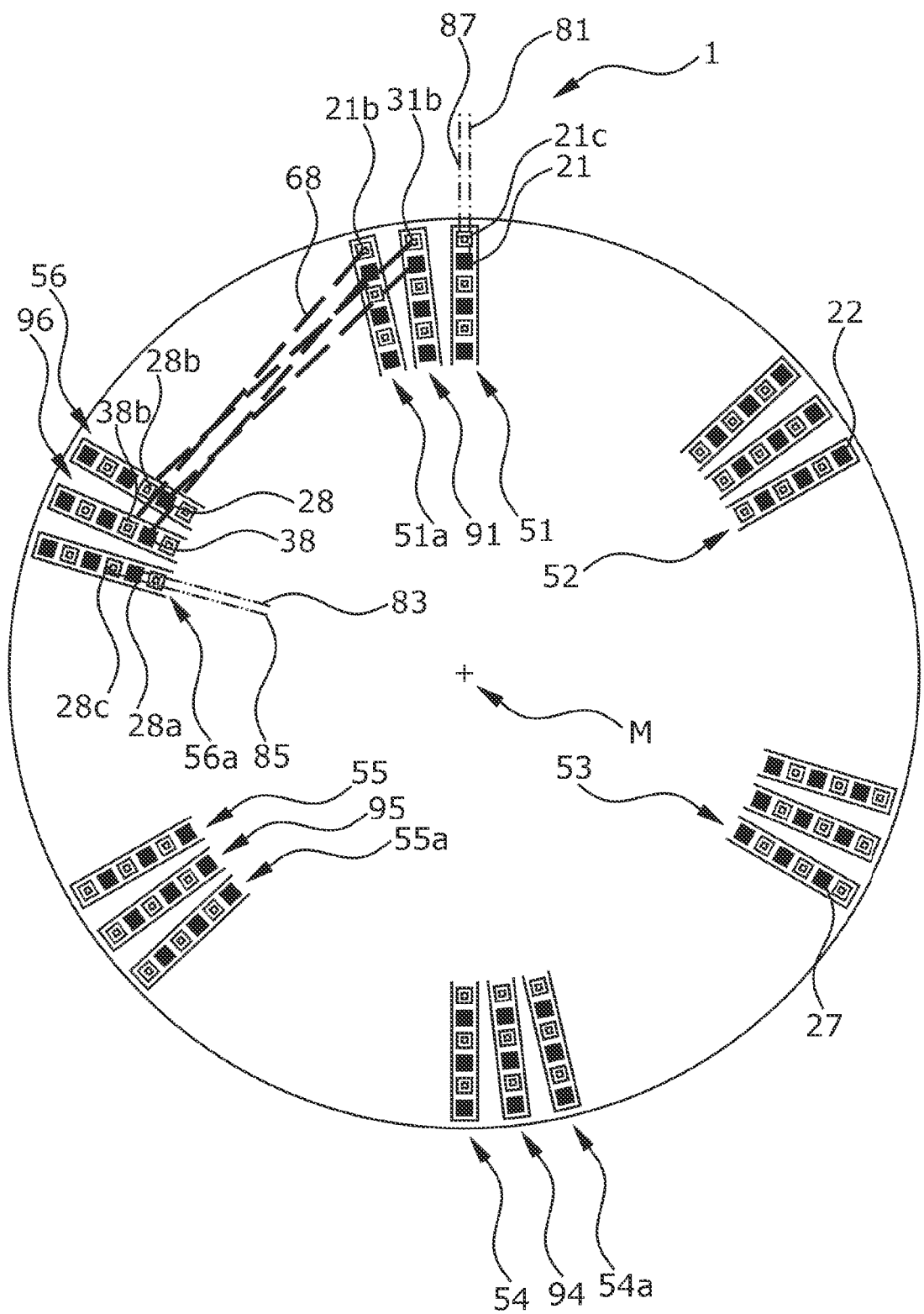
FIG. 9 shows a stator having two coils, consisting of three respective coil sections.

FIG. 9 shows a pin configuration through the first coil 201 from FIG. 6, which is illustrated by black squares. The same reference signs denote the same pins, slots and connections in the figures. Furthermore, the second coil 202 from FIG. 8 is illustrated as black squares on a white background and is located in the same slots but different layers. The coil sections of the two coils are connected by means of the seventh type of connection 67 (first coil) or the eighth type of connection 68 (second coil).

What is therefore shown are two parallel coils, each of which consists of three coil sections. The inputs and outputs of the coils are likewise shown. The input 81 of the first coil is located at the slot 51 and the output 83 at the slot 56*a*. The input 87 of the second coil is likewise located at the slot 51 and the output 85 at the slot 56*a*. The inputs and outputs of the two coils are thus in the same respective slot.

Figure 10:
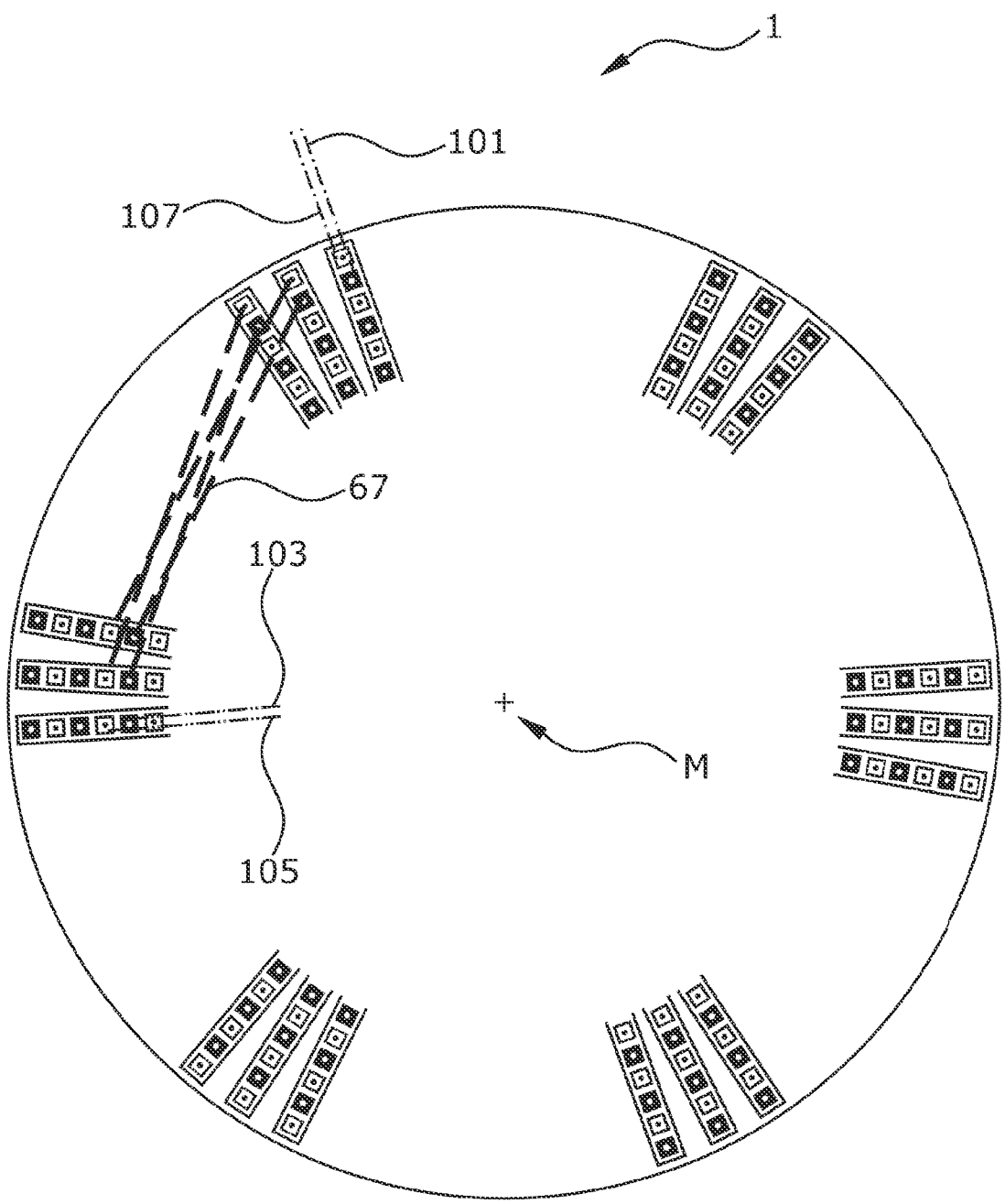
FIG. 10 shows a stator having two further coils.

FIG. 10 shows a pin configuration through a third and a fourth coil in the black squares with a white dot and the white squares with a black dot. This is produced by a winding pattern established in FIGS. 3, 4, 5, 7, which is offset counterclockwise by two slots in each case in comparison with the pins and connections of the coil sections illustrated in the latter figures. It should be noted that FIG. 7 corresponds to FIG. 3, but with offset layers and a counterclockwise circuit of the connections. The inputs 101 and outputs 103 of the third coil and inputs 107 and outputs 105 of the fourth coil are likewise shown. The inputs and outputs of the two coils are thus in the same respective slot.

Figure 11:
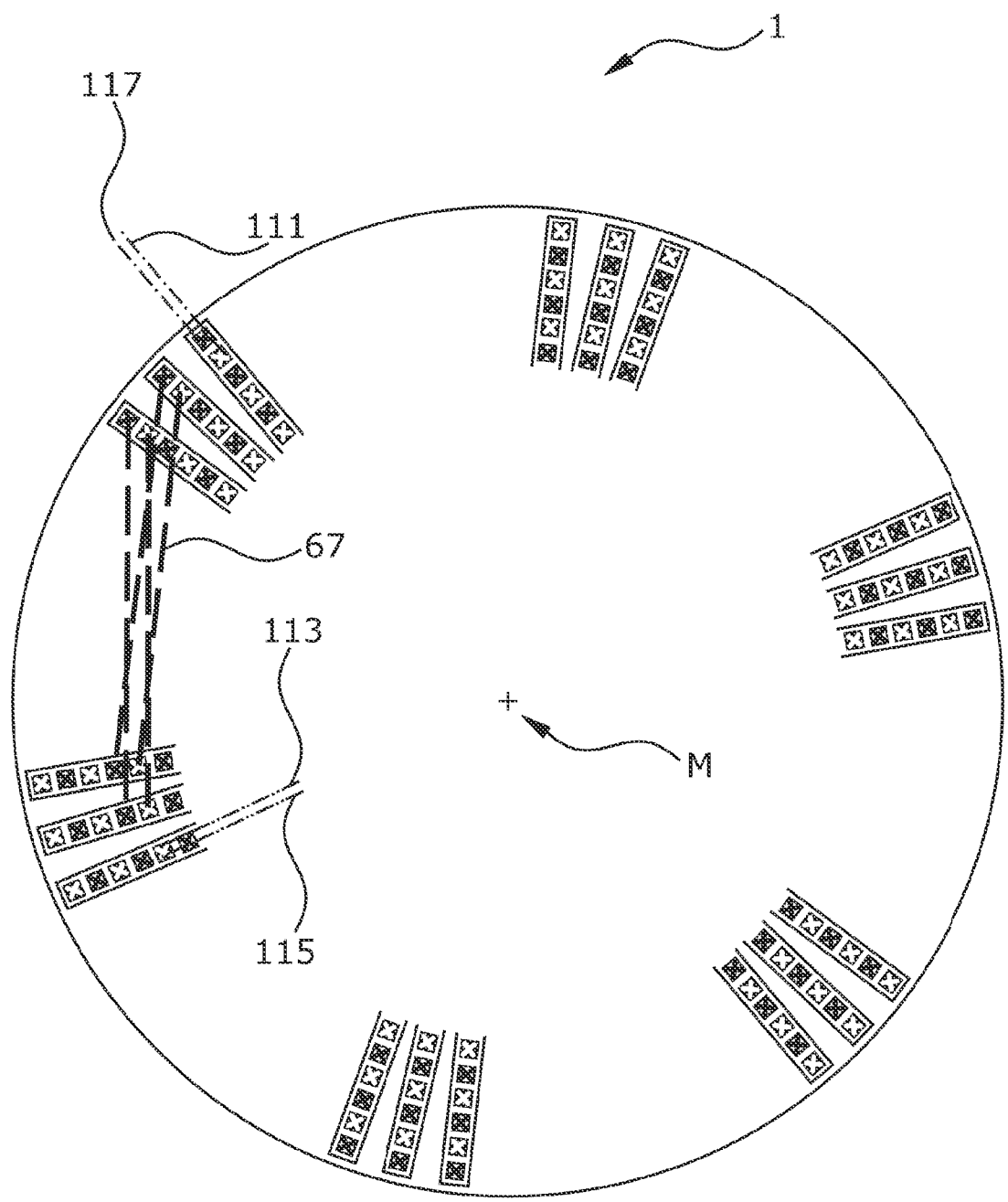
FIG. 11 shows a stator having two further coils.

FIG. 11 shows a pin configuration through a fifth and a sixth coil in the black squares with a white cross and the white squares with a black cross. This is produced by a winding pattern established in FIGS. 3, 4, 5, 7, which is offset counterclockwise by five slots in comparison with the pins and connections of the coil sections illustrated in the latter figures. It should be noted that FIG. 7 corresponds to FIG. 3, but with offset layers and a counterclockwise circuit of the connections. The inputs 111 and outputs 113 of the fifth coil and inputs 117 and outputs 115 of the sixth coil are likewise shown. The inputs and outputs of the two coils are thus in the same respective slot.

Figure 12:
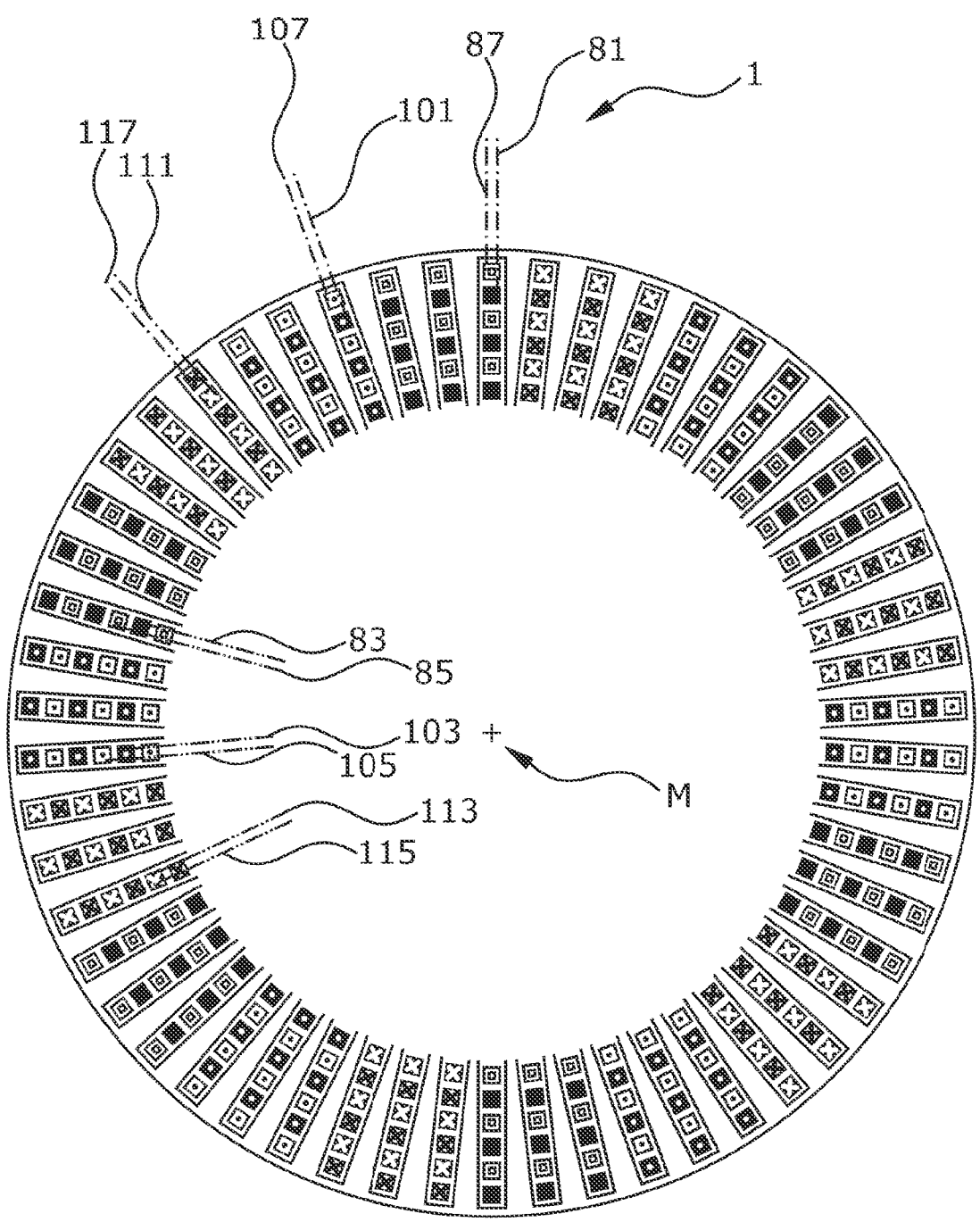
FIG. 12 shows a stator having six coils.

FIG. 12 shows a pin configuration through the six coils as a combination of FIGS. 10, 11 and 12. It is clear in particular from the position of the inputs 81, 87, 101, 107, 111, 117 and outputs 83, 85, 103, 105, 113, 115 that the coils can be interconnected within 18 slots. In the case of the 54-slot stator illustrated by way of example, it is thus possible to interconnect the inputs and outputs within one third of the stator circumference. Purely with respect to the inputs or outputs, a separate circuit within seven slots would be possible.

Figure 13:
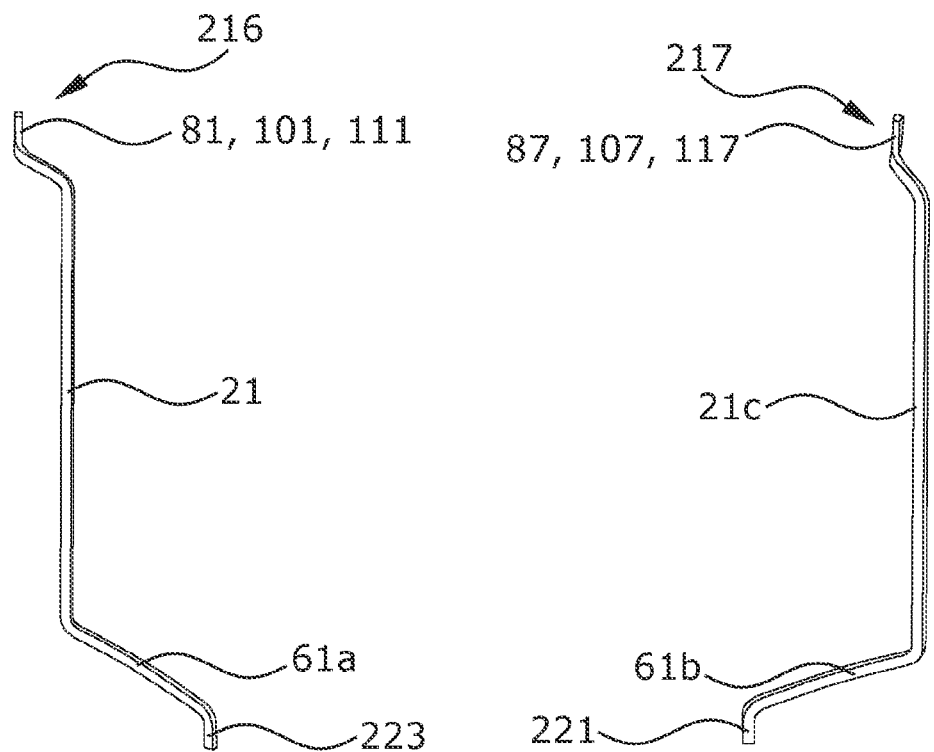
FIG. 13 shows a first and a second single pin.

On the left-hand side, FIG. 13 shows a first single pin 216, also referred to as an I-pin. In the center is located the first end pin 21, which is arranged for example in the first slot 51, layer L2, of the stator. The reference signs are identical to the previous figures. The first single pin 216 is illustrated with the first front end 7 upward from the perspective of the stator center point. At the bottom end, the first single pin 216 has a pin foot 61*a* with a second weld point 223. The input 81, 101, 111 is located at the top end.

The right-hand side of FIG. 13 shows a second single pin 217. In the center is located the fifth end pin 21c, which is arranged for example in the first slot 51, layer L1, of the stator. The reference signs are identical to the previous figures. The pins are illustrated with the first front end 7 upward from the perspective of the stator center point. At the bottom end, the second single pin 217 has a pin foot 61b with a first weld point 221. The input 87, 107, 117 is located at the top end.

Figure 14:
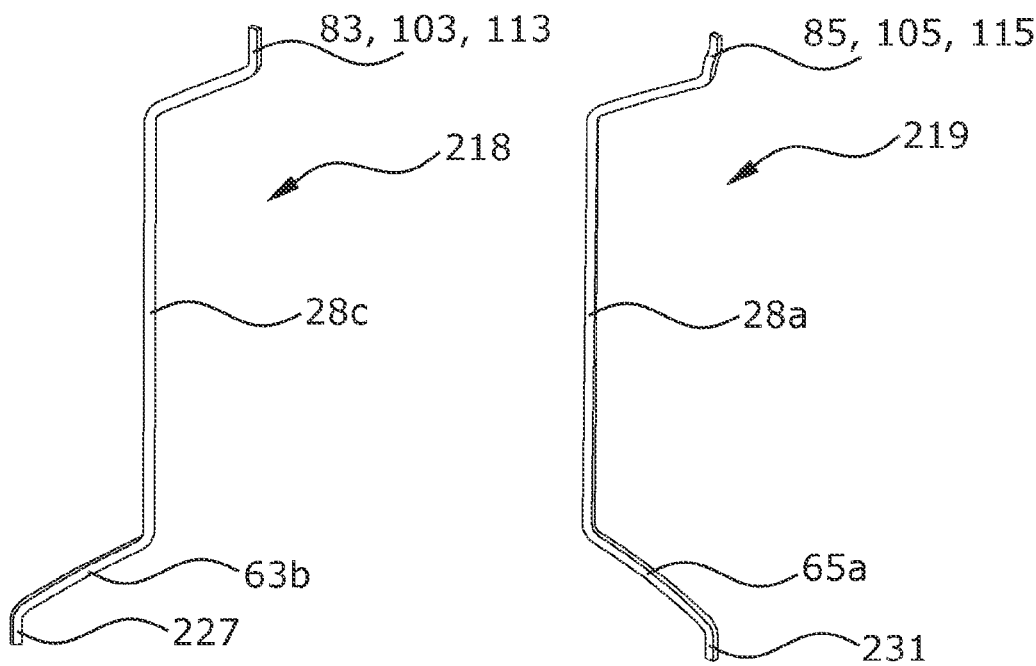
FIG. 14 shows a third and a fourth single pin.

On the left-hand side, FIG. 14 shows a third single pin 218, also referred to as an I-pin. In the center is located the eighth end pin 28c, which is arranged for example in the slot 56a, layer L4, of the stator. The reference signs are identical to the previous figures. The single pin is illustrated with the first front end 7 upward from the perspective of the stator center point. At the bottom end, the third single pin 218 has a pin foot 63b with a fourth weld point 227. The output 83, 103, 113 is located at the top end.

The right-hand side of FIG. 14 shows a fourth single pin 219. In the center is located the fourth end pin 28a, which is arranged for example in the slot 56a, layer L5, of the stator. The reference signs are identical to the previous figures. The pins are illustrated with the first front end 7 upward from the perspective of the stator center point. At the bottom end, the fourth single pin 219 has a pin foot 65a with a fifth weld point 231. The output 85, 105, 115 is located at the top end.

Figure 15:
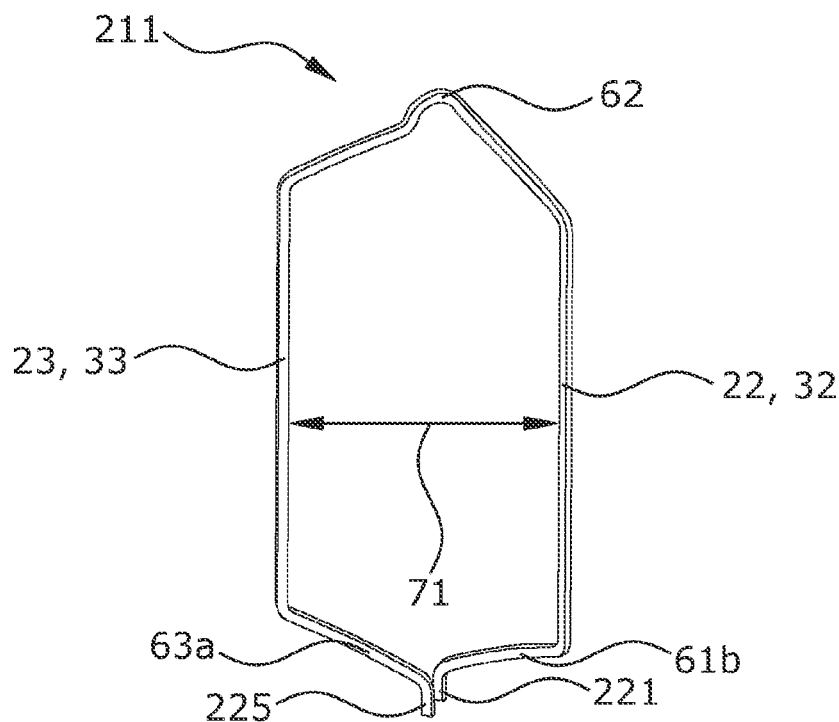
FIG. 15 shows a first double pin.

FIG. 15 shows a first double pin 211 or U-pin, which establishes the second type of connection 62 between a second pin 22, 32, 22a and a third pin 23, 33, 23a. The double pin 211 may bridge the first distance 71 between the slots. At the bottom end, the double pin has two inwardly bent pin feet 63a, 61b with a third weld point 225 and a first weld point 221.

Figure 16:
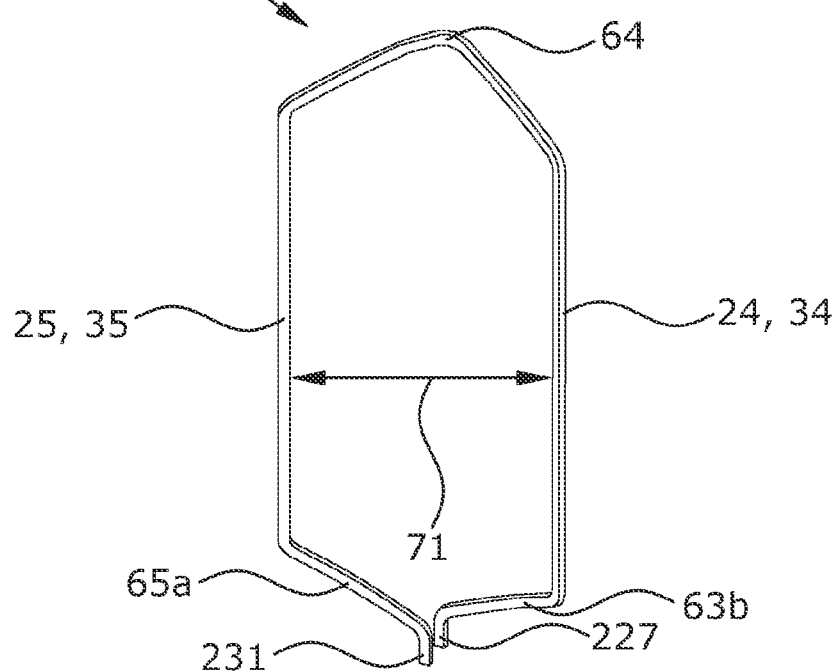
FIG. 16 shows a second double pin.

FIG. 16 shows a second double pin 212 or U-pin, which establishes the fourth type of connection 64 between a fifth pin 25, 35, 25a and a fourth pin 24, 34, 24a. The double pin 211 may bridge the first distance 71 between the slots. At the bottom end, the double pin has two inwardly bent pin feet 65a, 63b with a fifth weld point 231 and a fourth weld point 227.

Figure 17:
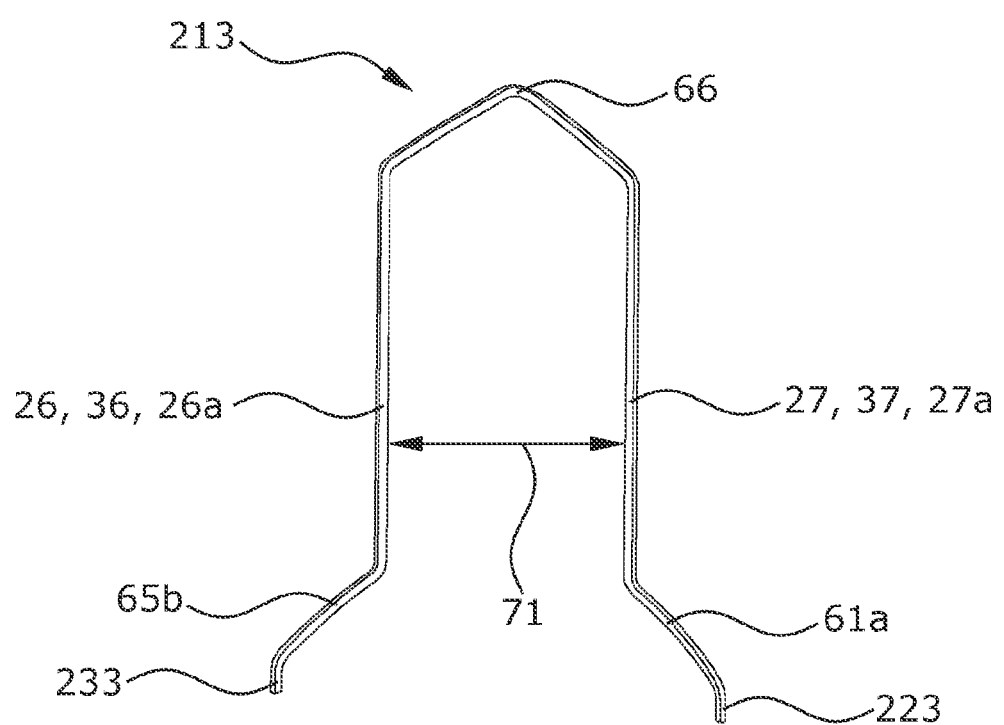
FIG. 17 shows a third double pin.

FIG. 17 shows a third double pin 213 or U-pin, which establishes the sixth type of connection 66 between a sixth pin 26, 36, 26a and a seventh pin 27, 37, 27a. The third double pin (213) may bridge the first distance 71 between the slots. At the bottom end, the double pin has two outwardly bent pin feet 65b, 61a with a sixth weld point 233 and a second weld point 223.

The first distance 71 is identical only with respect to the number of slots to be bridged. The actual spatial distance to be bridged is different, because the double pins connect different layers.

Figure 18:
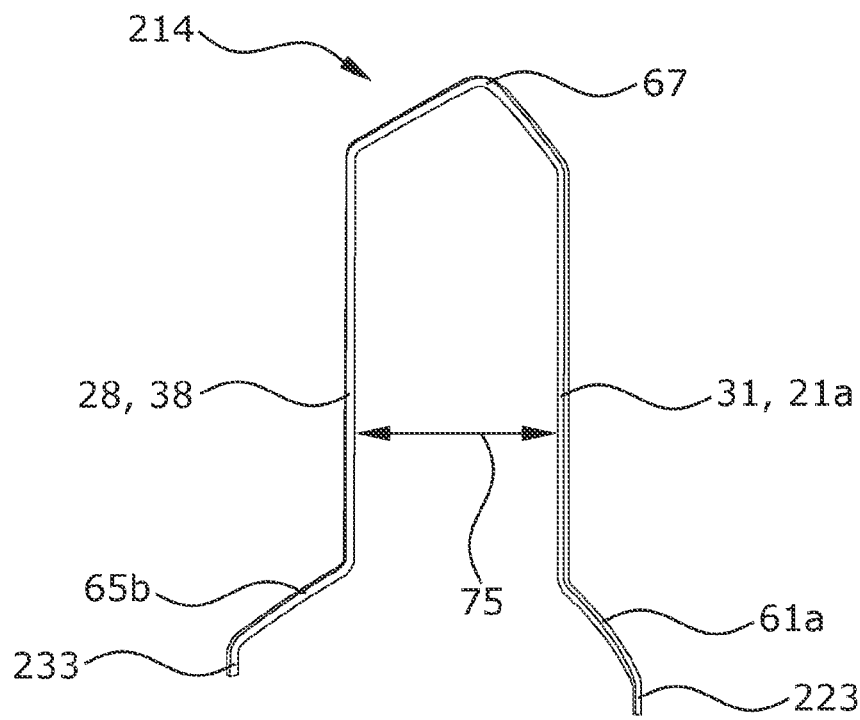
FIG. 18 shows a fourth double pin.

FIG. 18 shows a fourth double pin 214 or U-pin, which establishes the seventh type of connection 67 between a second end pin 28, 38 and a third end pin 31, 21a. The fourth double pin 214 may thus bridge the second distance 75 by one slot less than the first distance 71. At the bottom end, the fourth double pin 214 has two outwardly bent pin feet 65b, 61a with a sixth weld point 233 and a second weld point 223.

Figure 19:
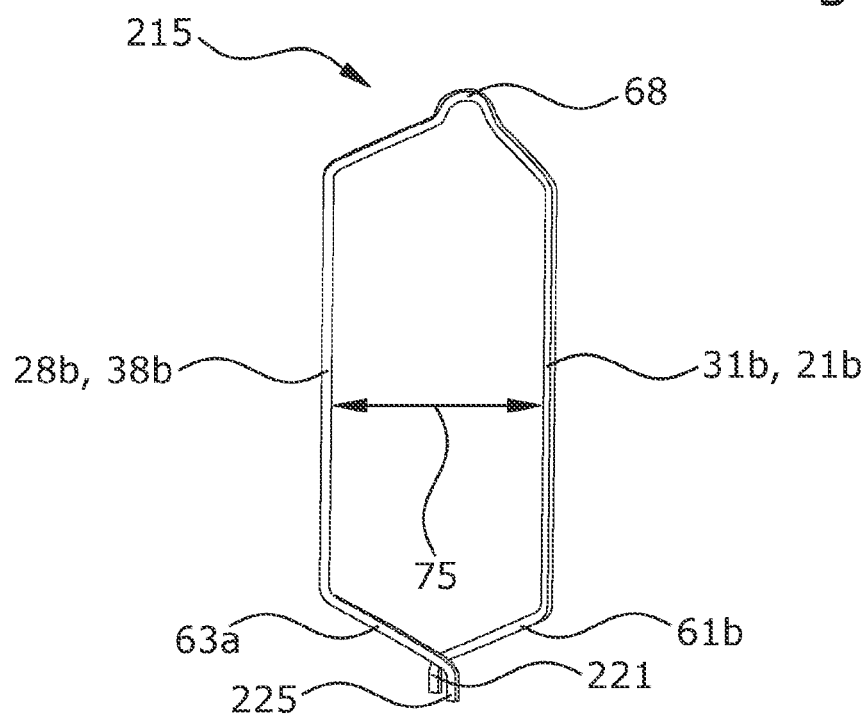
FIG. 19 shows a fifth double pin.

FIG. 19 shows a fifth double pin 215 or U-pin, which establishes the eighth type of connection 68 between a sixth end pin 28b, 38b and a seventh end pin 31b, 21b. The fifth double pin 215 may thus bridge the second distance 75 by one slot less than the first distance 71. At the bottom end, the fifth double pin 215 has two inwardly bent pin feet 63a, 61b with a third weld point 225 and a first weld point 221.

The various single and double pins in FIGS. 13 to 19 have similar pin feet. The first type of connection 61 is formed by welding the first weld point 221 at the pin foot 61a to the second weld point 223 at the pin foot 61b according to the winding pattern. The third type of connection 63 is formed by welding the second weld point 225 at the pin foot 63a to the fourth weld point 227 at the pin foot 63b according to the winding pattern. The fifth type of connection 65 is formed by welding the fifth weld point 231 at the pin foot 65a to the sixth weld point 233 at the pin foot 65b according to the winding pattern. The respective type of connection also connects the single pins to the double pins, with the result that the pins run around the stator in the form of a continuous electrical conductor.

Figure 20:
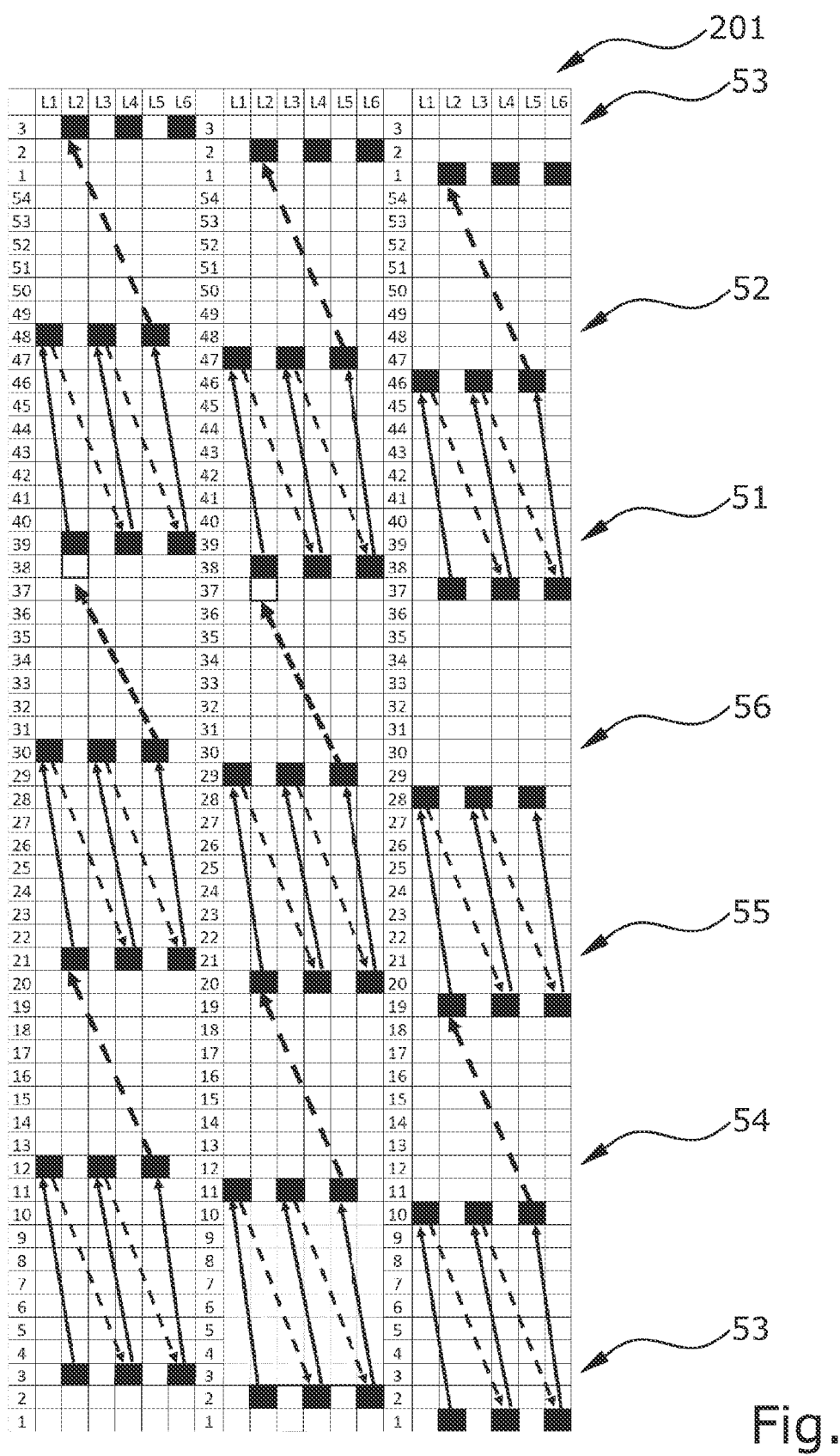
FIG. 20 shows a winding pattern of a first coil.

FIG. 20 shows the winding pattern of the three coil sections of the first coil 201. The consecutive "slot numbers" are not reference signs. The reference signs with an arrow pointing to the slots are identical to the previous FIGS. and allow a comparison to be made with these figures.

FIG. 21 shows the winding pattern of the three coil sections of the second coil 202. The consecutive "slot numbers" are not reference signs. The reference signs with an arrow pointing to the slots are identical to the previous FIGS. and allow a comparison to be made with these figures.

Figure 22:
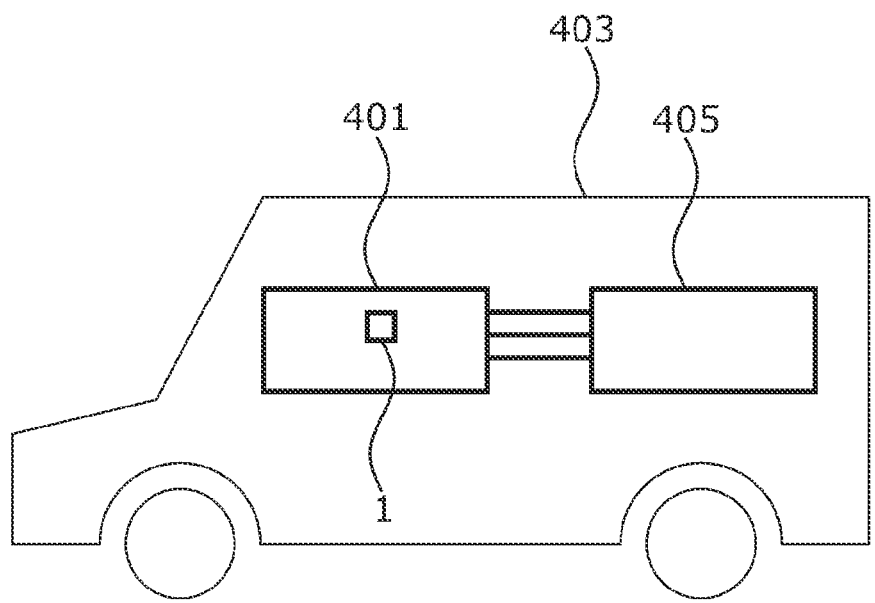
FIG. 22 shows a vehicle having an electric machine, in particular an electric motor, having a stator with an interface.

FIG. 22 is a basic diagram of an exemplary embodiment of a vehicle 403, for example a hybrid vehicle or an electric vehicle, comprising an electric machine 401, in particular an electric motor, with an exemplary embodiment of the stator 1 for driving the vehicle 403. The vehicle 403 may also comprise an inverter 405, which supplies the electric machine 401 with an alternating current from a direct-current source.

LIST OF REFERENCE SIGNS

1 Stator
2, 3, 22-38b Pin
5, 51-56a, 91-96 Slot
7 First front end
9 Second front end
21 First end pin
28, 38 Second end pin
31, 21a Third end pin
28a Fourth end pin
21c Fifth end pin
28b, 38b Sixth end pin
21b, 31b Seventh end pin
28c Eighth end pin
41-49, 41b, 42b, 43b Winding
61 First type of connection
62 Second type of connection
63 Third type of connection
64 Fourth type of connection
65 Fifth type of connection
66 Sixth type of connection
67 Seventh type of connection
68 Eighth type of connection
61a, 61b, 63a, 63b, 65a, 65b Pin foot
71 First distance
75 Second distance
73 Third distance
81, 87, 101, 107, 111, 117 Input
83, 85, 103, 105, 113, 115 Output
201 First coil
202 Second coil
211, 212, 213, 214, 215 Double pin
216, 217, 218, 219 Single pin 221, 223, 225, 227, 231, 233 Weld point
401 Electric machine
403 Vehicle
405 Inverter
L1, L2, L3, L4, L5, L6 Layer
M Stator center point

The invention claimed is:

1. A stator for an electric machine, comprising:
a plurality of pins arranged in slots in the stator on concentric circles at different distances from a stator center point, wherein each concentric circle forms a layer,
wherein each layer is defined by n, wherein n is a natural number;
wherein:
each of six pins of the plurality of pins, in different layers are connected to one another in series and form a winding,
a first pin of the winding is located in a first slot in a 6n-4 layer,
a second pin of the winding is located in a second slot in a 6n-5 layer, wherein the second slot is at a first radial distance from the first slot in a first circumferential direction of the stator,
a third pin of the winding is located in the first slot in a 6n-2 layer,
a fourth pin of the winding is located in the second slot in a 6n-3 layer,
a fifth pin is located in the first slot in a 6n layer, and
a sixth pin of the winding is located in the second slot in a 6n-1 layer.

2. The stator according to claim 1, wherein the stator has a first front end and a second front end, and
the first pin and the second pin are connected to one another on the second front end by means of a first type of connection,
the second pin and the third pin are connected to one another on the first front end by a second type of connection,
the third pin and the fourth pin are connected to one another on the second front end by a third type of connection,
the fourth pin and the fifth pin are connected to one another on the first front end by a fourth type of connection,
the fifth pin and the sixth pin are connected to one another on the second front end by a fifth type of connection,
wherein the first, second, third, fourth and fifth types of connection differ from one another.

3. The stator according to claim 1, wherein the stator (1) has at least two windings and at least the sixth pin in the second slot is connected to a seventh pin (27) in the 6n-4 layer in a third slot by a sixth type of connection.

4. The stator according to claim 3, wherein the stator comprises a plurality of windings, which extend over the entire circumference of the stator and thereby form a coil section.

5. The stator according to claim 4, wherein respectively one pin of three coil sections is connected to one another by seventh type of connection or an eighth type of connection and form a coil.

6. The stator according to claim 5, wherein the coil sections form six coils and three phases are assigned to them in such a way that two coils, which are assigned to the same phase, are respectively located in three adjacent slots.

7. The stator according to claim 5, wherein each input of an end pin of two coils is respectively connected to one another by a ninth type of connection.

8. The stator according to claim 7, wherein each output of an end pin of the two coils is respectively connected to one another and the two coils as a result are connected in parallel, and are assigned to one phase.

9. The stator according to claim 1, wherein the second type of connection comprises a first double pin, which is formed from the second pin and the third pin, wherein the first double pin has two inwardly bent pin feet with a respective weld point and bridges a first radial distance.

10. The stator according to claim 1, wherein the fourth type of connection comprises a second double pin, which is formed from the fourth pin and the fifth pin, wherein the second double pin has two inwardly bent pin feet with a respective weld point and bridges a first radial distance.

11. The stator according to claim 1, wherein the sixth type of connection comprises a third double pin, which is formed from the sixth pin and the seventh pin, wherein the second double pin has two outwardly bent pin feet with a respective weld point and bridges a first radial distance.

12. The stator according to claim 1, wherein the seventh type of connection comprises a fourth double pin, which is formed from a second end pin and a third end pin, wherein the fourth double pin has two outwardly bent pin feet with a respective weld point and bridges a second radial distance.

13. The stator according to claim 1, wherein the eighth type of connection comprises a fifth double pin, which is formed from a sixth end pin and a seventh end pin, wherein the fifth double pin has two inwardly bent pin feet with a respective weld point and bridges a second radial distance.

14. The stator according to claim 1, wherein a first single pin comprises a first end pin and has a pin foot which is bent clockwise and has a weld point.

15. The stator according to claim 1, wherein a second single pin comprises a fifth end pin and has a pin foot which is bent counterclockwise and has a weld point.

16. The stator according to claim 1, wherein a third single pin comprises a fourth end pin and has a pin foot which is bent counterclockwise and has a weld point.

17. The stator according to claim 1, wherein a fourth single pin comprises an eighth end pin and has a pin foot which is bent clockwise and has a weld point.

18. The stator according to claim 1, wherein the first type of connection is formed by a welded connection between a first weld point at the pin foot of the first double pin or of the fifth double pin or of the second single pin and a second weld point at the pin foot of the third double pin or of the fourth double pin or of the first single pin.

19. The stator according to claim 1, wherein the third type of connection is formed by a welded connection between a third weld point at the pin foot of the first double pin or of the fifth double pin and a fourth weld point at the pin foot of the second double pin or of the third single pin.

20. The stator according to claim 1, wherein the fifth type of connection is formed by a welded connection between a fifth weld point at the pin foot of the second double pin or of the fourth single pin and a sixth weld point at the pin foot of the third double pin or of the fourth double pin or of the fourth single pin.

* * * * *